(12) United States Patent
Pan

(10) Patent No.: US 6,216,105 B1
(45) Date of Patent: Apr. 10, 2001

(54) METHOD AND DEVICE FOR DIFFERENTIATING BETWEEN DATA AND VOICE DIGITAL SIGNALS

(75) Inventor: John W. Pan, Hsinchu (TW)

(73) Assignee: Loop Telecommunication International, Inc., Hsinchu (TW)

(*) Notice: Subject to any disclaimer, the term of this patent is extended or adjusted under 35 U.S.C. 154(b) by 0 days.

(21) Appl. No.: 09/090,320

(22) Filed: Jun. 4, 1998

(51) Int. Cl.[7] .............................. G10L 11/00; H04J 1/02
(52) U.S. Cl. .................................. 704/270; 704/201
(58) Field of Search ........................ 204/270, 246, 204/200; 704/270, 200, 201, 246, 226, 227, 228; 370/493, 494, 495

(56) References Cited

U.S. PATENT DOCUMENTS 3,927,259 * 12/1975 Brown .................................. 704/200
4,403,322 * 9/1983 Kato et al. ........................ 370/110.1
4,476,559 * 10/1984 Brolin et al. ..................... 370/110.1

* cited by examiner

*Primary Examiner*—Richemond Dorvil
(74) *Attorney, Agent, or Firm*—Bacon & Thomas, PLLC

(57) ABSTRACT

A method and device for determining whether a stream of digital words, each comprising a plurality of binary digits, represents data signals, or represents digitized voice is disclosed. The method comprises the step of testing the steadiness or randomness of an individual bit within a predetermined sequence of each said digital words. If the individual bit is tested to be random, the stream of digital words represents data signals; and if the individual bit is test to be steady, the stream of digital words represents voice signals. The device comprises a shift registers to store the predetermined sequence of the digital words, a counter to control the shift register, and a gate arrays to determine steadiness or randomness of the individual bit within the predetermined sequence of each said digital words.

30 Claims, 2 Drawing Sheets

METHOD AND DEVICE FOR DIFFERENTIATING BETWEEN DATA AND VOICE DIGITAL SIGNALS

FIELD OF THE INVENTION

The present invention relates to the processing of signals used in telecommunications and more particularly to the transmission by digital means of customer generated signals.

BACKGROUND OF THE INVENTION

In a digital transmission system, the signals from the customer are customarily grouped into 8 binary digits, called 8-bit words. As a matter of convention, each bit of the 8-bit word is numbered. The most significant bit, the first bit to arrive, is numbered Bit-0, followed by Bit-1, Bit-2, and so on. The least significant bit is Bit-7. For transmission over the telecommunications network, these 8-bit words are then combined in a serial form with 8-bit words from other customers. Thus each customer's signal occupy a period of time within a transmission line, which is shared with other customers. The time for each customer is called a "time-slot". This method of combining one customer's signal with others is called "time division multiplexing". For digital transmission systems used in North America, 24 such 8-bit words are combined into a transmission system called T1. Customers usually send a series of 8-bit words, usually 8000 times a second. These words are then serially combined with 8-bit words from other customers also at 8000 times a second. The series of 8-bit words from one customer are called a channel, or a digital communications channel.

When the T1 transmission system, also called a T1 line, reaches a juncture, called a node, the 24 channels of 8-bit words may be required to be processed for the purpose of switching. For example, a customer's signal arriving on a T1 line occupying Channel 3, may be sent on its way on a second T1 line occupying Channel 23. This process is called digital switching.

If the customer's signal is data, such as an inventory report, and is in the form of a series of 8-bit words, then the process of digital switching is relatively simple in concept. When the customer's 8-bit word arrives on a first T1 line, according to the arriving channel assignment, it is stored in a temporary memory. When it is time for the customer's 8-bit word to be sent on its way on a second T1 line, the stored word is inserted at the proper time slot according to the channel assignment. However, if the customer's signal is not data but rather a voice conversation transformed into digital signals, called digitized voice, then there are other aspects of the digital switching which must be considered. This is the signaling information.

Signaling relates to the supervision aspects of a voice conversation. For example, when a person lifts up the phone to make a telephone call, the information that the customer has lifted the phone, i.e., off-hook, must be transmitted to the far end. To the person receiving the call, the ring of the telephone is another example of signaling information. For the T1 transmission system, signaling is sent along with the digitized voice in combined 8-bit words. This process is called "robbed bit signaling". In 5 of every 6 8-bit words sent, the 8-bit words are faithfully transmitted and reproduced at the far end. However, in 1 of every 6 words sent, the least significant bit (Bit-7) of the 8-bit word is substituted with the signaling bit (i.e., A bit). The result is that the customer's voice is digitized into 8-bit words 5 out of 6 times, and digitized into 7-bit words 1 out of 6 times. In digitized voice, more bits represents greater fidelity in the overall system. In the T1 system, this method results in a fidelity commonly known as 7 ⅚ bit fidelity.

When the digitized voice is to be switched, the signaling information must be extracted from the incoming T1 line and reinserted into the outgoing T1 line. This is because the location of the 1 out of 6 words, where the signaling bit is inserted, is not determined by each channel, but by the timing of the T1 transmission line. In many cases, the reinserted signaling bit on the outgoing T1 line is at a different word when compared to the incoming bit stream. Here is where procession for data and for digitized voice must be different. For data, no signaling processing should take place. Otherwise, customer's data would be mutilated due to moving what is thought to be the signaling bit into a different place. For voice, a signaling process should take place to preserve the transmission of the signaling information. Thus it is important for the system administrator to know which channel is carrying data, and which channel is carrying voice. This knowledge is obtained usually by searching the records for the original customer order whether data or voice is requested. Another way is to examine the actual 8-bit words being transmitted and make a determination, based on the characteristic difference between data and digitized voice. Such prior methods are time-consuming and unreliable.

Thus, it is desirable to provide an approach for automatically differentiating between data and voice digital signals to overcome the drawbacks of the prior art.

SUMMARY OF THE INVENTION

It is an object of the present invention to provide an automatic device for determining whether the customer's digital signals, in the form of a stream of 8-bit words, represent data, or represent digitized voice. Essential to the present invention is the assumption that if the signal is indeed digitized voice, signaling information, in the format of "robbed-bit-signaling" would also be present. Otherwise, for data, no signaling information will be found.

The basis of this automatic determination is the observation that (a) both data and digitized voice tend to change rapidly, with each consecutive 8-bit word different from the previous, and (b) signaling tends to change slowly, following the motion of the users hand, or the ringing cadence. More precisely, both data and digitized voice may change 8000 times a second, or every 0.125 milliseconds, while signaling information changes at most 20 times a second, or every 50 milliseconds. Thus it is possible, by examining the rate of change of the supposed signaling bit i.e., the bit located at bit 7, to determine whether it is indeed a signaling bit i.e., whether bit-7 is in fact the A bit. If it is determined to be a signaling bit, then by extension, the 8-bit words would represent digitized voice. If such a slowly changing signaling bit is not found, then by extension, the 8-bit words would represent data.

In order to simplify this embodiment of the present invention, when consecutive words need to be compared as to whether they change, only bits in position 6 (Bit-6) in each consecutive 8-bit word are examined to determine whether it changes.

In order to improve the accuracy of the determination of the signaling bit, the present invention proposes that each such test of the signaling bit be done twice and at different times. Only when the result of both tests agree would the determination be accepted.

In a further refinement, further cases are considered where both data and digitized voice may be idle. This is when no data is being sent, or when the digitized voice signal represents silence. In both cases, each consecutive 8-bit word may be the same idle word, and thus neither the supposed A bit, nor the words would be changing. When this condition is detected, no determination would be made.

In summary, when the supposed signaling bit A is found to be changing rapidly, then the signal is determined to be DATA. When the supposed signaling bit A is found to be not changing while the rest of the bits are changing rapidly, then the signal is determined to be VOICE. If neither of the above conditions is detected, then no conclusion is reached until the next test.

This test, of whether the signal is data or digitized voice, is repeated periodically, say once every minute. Thus, when the customer abruptly changes the signal from data to voice or vice versa, the system may not know of the change until some time later. Still, this automatic device of determination is faster than manual methods.

The above and other objects, features and advantages of the present invention will become apparent from the following detailed description taken with the accompanying drawings.

DETAILED DESCRIPTION OF THE INVENTION

Figure 1:
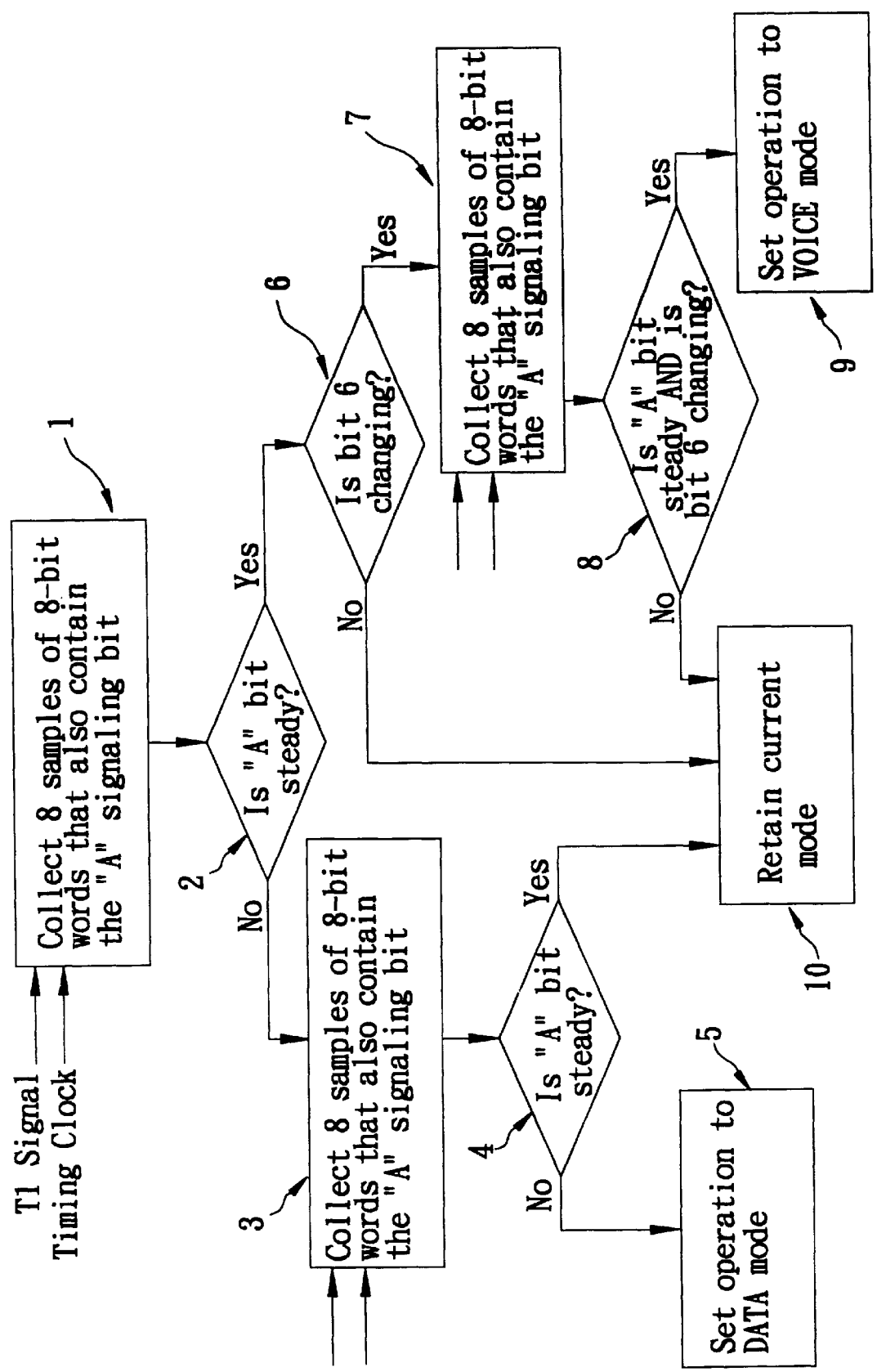
FIG. 1 shows a flow chart of the present invention.

In FIG. 1, a flow chart of the present invention is shown. Block 1 extracts 8 consecutive words of the channel in question and stores them for further processing. These 8-bit words should contain, if digitized voice, the A signaling bit. Block 2 tests the supposed A-bit, i.e., bit-7 to determine if it is steady, that is, if it is all 1's or all 0's. If steady, the test progresses to block 6, to be discussed in the next paragraph, to check whether the word itself is steady, by performing a second test on least one bit other than bit 7, such as bit 6. If the test shows that the A-bit is not steady, that is, it contains both 1's and 0's, then the signal progresses to block 3. Similar to block 1, block 3 collects another 8 consecutive words, and then block 4 repeats a test identical to block 2. If the A-bit again shows variation, that is, it contains both 1's and 0's, then the conclusion is reached in block 5 that this signal is DATA.

Back to block 2, if the test shows that the A-bit is steady, that is, it is either all 1s or all 0s, then the second test of these 8 words is performed in block 6. In this block, another bit such as bit 6 of all 8 words are tested to determine if it is changing, that is, if it contains both 1's and 0's. If the Test shows that bit-6 is changing, then the test progresses to block 7. Block 7 is identical to block 1 in that it collects another 8 words in a similar manner and repeats the tests in block 7 and block 8. In block 8, if the A-bit again shows steady and bit-6 again shows changes, then the conclusion is reached in block 9 that this signal is VOICE.

If the test in block 4 shows that the A-bit is steady, or if the test in block 6 or block 8 shows that bit-6 is also steady, then the process moves to block 10, meaning no conclusion can be reached from examining the samples collected in this test. These inconclusive results occur when (a) the 8 samples include the event that the A-bit did change, thus another 8 samples are needed to verify, or (b) the customer has sent an idle signal for data or voice, which will cause the test in block 2 and block 8 to show steady bit-6 along with the steady A-bit.

Figure 2:
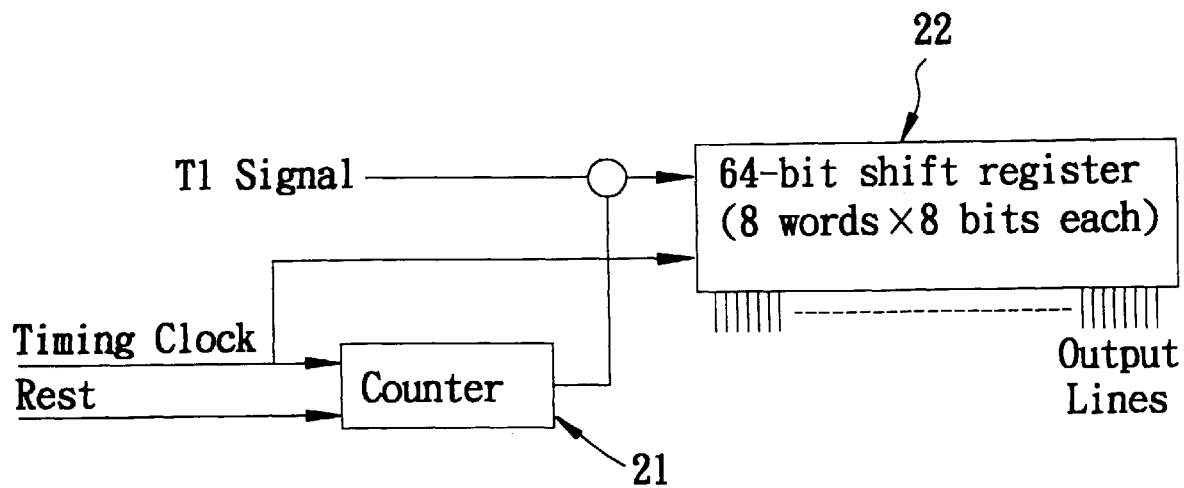
FIG. 2 shows a schematic circuit block diagram for block 1 of FIG. 1.

Referring now to FIG. 2, a schematic circuit block diagram for block 1 of FIG. 1 is shown. The circuit has two inputs. One is the incoming T1 signal. The other is a timing clock, which is used to extract the relevant 8-bit words embedded within the T1 signal. This timing clock coincides precisely with the occurrence of the desired 8-bit words. The generation of such timing clock is complex, but straightforward. In fact, there are commercially available integrated circuit (IC) chips, called "T1 Framer Chips", which would provide this signal.

As shown, the circuit has a counter 21 and a shift register 22. The purpose of counter 21 is to start and stop the reception of the desired 8-bit words into shift register 22. Thus when shift register 22 has received a new series of 8-bit words, the input process is stopped so that the contents of shift register 22 can be analyzed by other blocks in FIG. 1. The reset input of counter 21 enables the process lo start again so a new series of 8-bit words can be captured and analyzed.

The circuit designs for blocks 3 and 7 are substantially identical to block 1 with the exception that block 3 has its reset input connected to the output "No" of block 2, and block 7's reset input to the output "Yes" of block 6.

Figure 3:
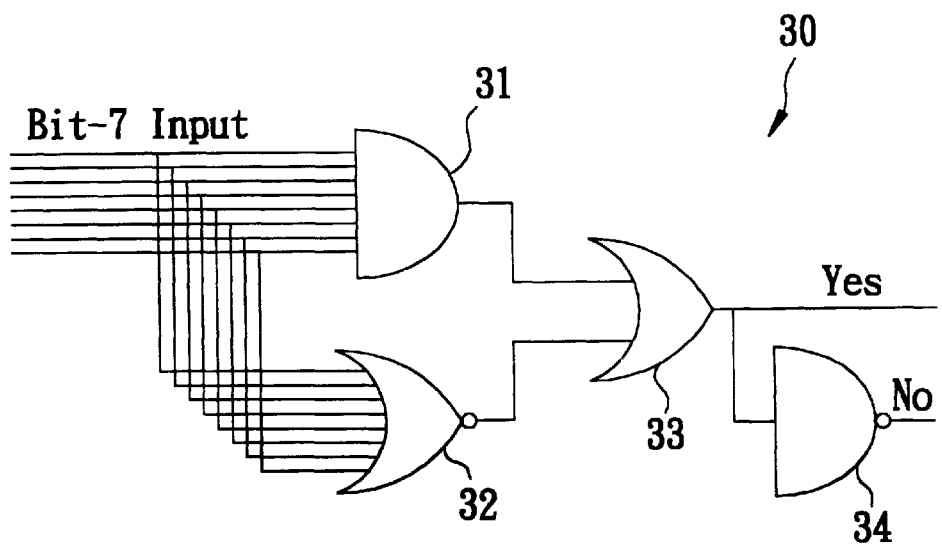
FIG. 3 shows a schematic circuit diagram for block 2 of FIG. 1.

Referring to FIG. 3, a schematic circuit diagram for block 2 of FIG. 1 is shown. The circuit forms a gate array 30. It functions to determine, from the 8-bit words stored in shift register 22, whether the A bit is steady or changing. To do this, all the lines for Bit-7 of each word in shift register 22 are directed to gate array 30. Gate array 30 comprises an AND gate 31, a NOR gate 32, an OR gate 33, and a NAND gate 34. Recall Bit-7 is also the A signaling bit if the customer signal is digitized voice. Gate array 30 is designed so that only if all the bit-7s are 0s, or all the bit-7s are 1s, then the output is a 1 (i.e., YES). Otherwise, if the 8 bit-7s contain both 1s and 0s, the output is a 0 (i.e., NO).

The circuit design for block 4 is the same as block 2. The block 6 circuit is different from blocks 2 and 4 merely in that block 4 receives Bit-6 lines from shift register 22 of FIG. 2 as its inputs.

As for the circuit design of block 8, it is a combination of the circuits for block 2 and block 6.

Although the invention has been described in detail, it should be understood that numerous modifications and variations can be made without departing from the spirit and scope of the invention set forth in the appended claims.

What is claimed is:

1. A method for determining whether a stream of digital words, each comprising of a plurality of binary digits, represents data signals, or represents voice signals, comprising the steps of:

acquiring a predetermined sequence of said digital words; and testing the steadiness or randomness of an individual bit within said predetermined sequence of each said digital words, where if said individual bit is tested to be random, said stream of digital words represents data signals; and if said individual bit is tested to be steady, said stream of digital words represents voice signals.

2. The method of claim 1, wherein each said digital word consists of 8 binary digits.

3. The method of claim 2, wherein said predetermined sequence of said digital words includes 8 digital words.

4. The method of claim 3, wherein said individual bit is an A bit.

5. The method of claim 1, further comprises the step of testing the steadiness or randomness of another individual bit within each said digital words, where if said individual bit is tested to be random, said stream of digital words represents data signals; and if said individual bit is tested to be steady and said another individual bit is tested to be random, said stream of digital words represents voice signals.

6. The method of claim 5, wherein said another individual bit is bit 6.

7. The method of claim 5, wherein said acquiring and testing steps are repeated once for another predetermined sequence of said digital words.

8. The method of claim 5, wherein said testing step for said another individual bit is performed by examining the value of said another individual bit within each said digital words.

9. The method of claim 8, wherein if said examined values are all 1's or all 0's, said another individual bit has said steadiness.

10. The method of claim 8, wherein if said examined values are not all 1's or all 0's, said another individual bit has said randomness.

11. The method of claim 1, wherein said acquiring and testing steps are repeated once for another predetermined sequence of said digital words.

12. The method of claim 1, wherein said testing step is performed by examining the value of said individual bit within each said digital words.

13. The method of claim 12, wherein if said examined values are all 1's or all 0's, said individual bit has said steadiness.

14. The method of claim 12, wherein if said examined values are not all 1's or all 0's, said individual bit has said randomness.

15. A device for determining whether a stream of digital words, each comprising of a plurality of binary digits, represents data signals, or represents voice signals, comprising:

means for acquiring a predetermined sequence of said digital words; and means for testing the steadiness or randomness of an individual bit within said predetermined sequence of each said digital words, where if said individual bit is tested to be random, said stream of digital words represents data signals; and if said individual bit is test to be steady, said stream of digital words represents voice signals.

16. The device of claim 15, wherein said acquiring means includes a shift register to store said predetermined sequence of said digital words.

17. The device of claim 16, wherein said acquiring means further includes a counter to control said shift register.

18. The device of claim 15, wherein said testing means includes a gate array.

19. The device of claim 18, wherein said gate array includes an AND gate, a NOR gate, an OR gate, and a NAND gate.

20. The device of claim 15, wherein each said digital word consists of 8 binary digits.

21. The device of claim 20, wherein said predetermined sequence of said digital words includes 8 digital words.

22. The device of claim 15, wherein said individual bit is an A bit.

23. The device of claim 15, further comprises the means for testing the steadiness or randomness of another individual bit within each said digital words, where if said individual bit is tested to be random, said stream of digital words represents data signals; and if said individual bit is tested to be steady and said another individual bit is tested to be random, said stream of digital words represents voice signals.

24. The device of claim 23, wherein said another individual bit is bit 6.

25. The device of claim 23, wherein said testing means for said another individual bit is to examine the value of said another individual bit within each said digital words.

26. The device of claim 25, wherein if said examined values are all 1's or all 0's, said another individual bit has said steadiness.

27. The device of claim 25, wherein if said examined values are not all 1's or all 0's, said another individual bit has said randomness.

28. The device of claim 15, wherein said testing means is to examine the value of said individual bit within each said digital words.

29. The device of claim 28, wherein if said examined values are all 1's or all 0's, said individual bit has said steadiness.

30. The device of claim 28, wherein if said examined values are not all 1's or all 0's, said individual bit has said randomness.

* * * * *